(No Model.)
C. DODSWORTH & P. BURKE.
DEVICE FOR HEATING AND COOLING MASHES.
No. 271,692. Patented Feb. 6, 1883.
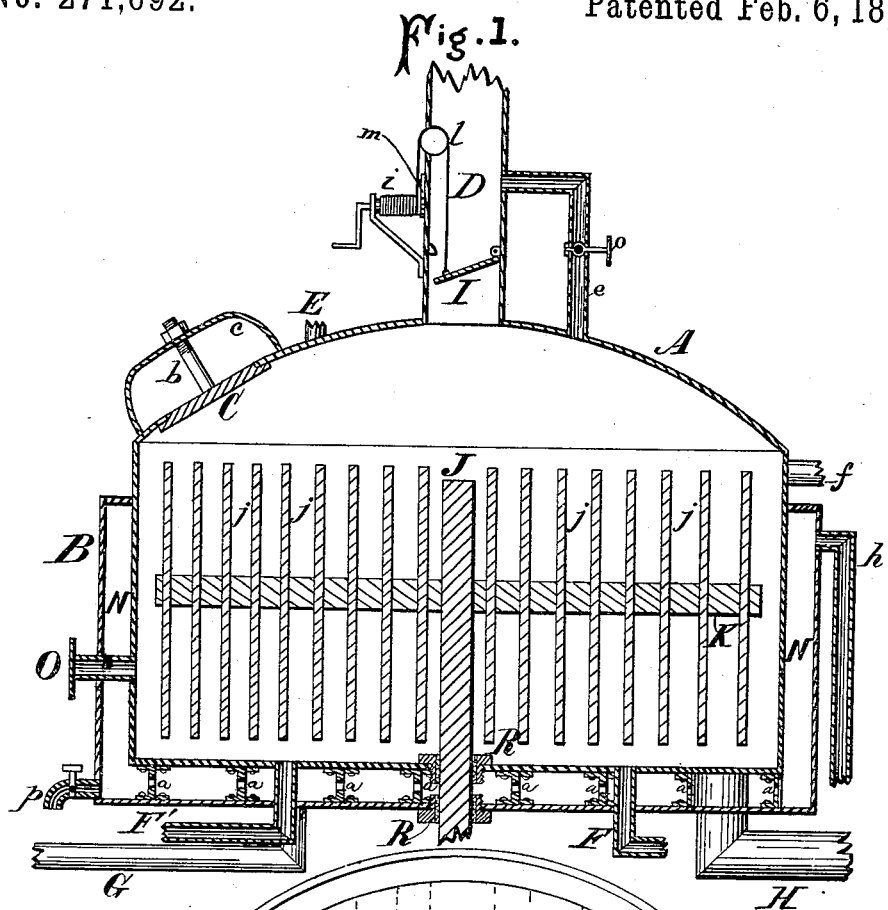
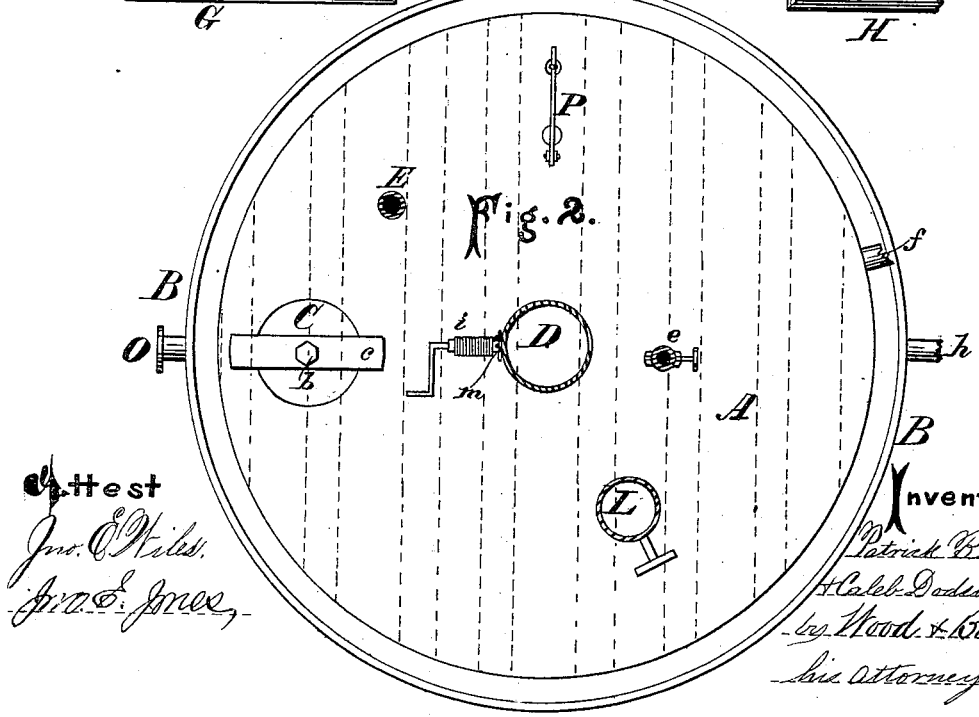

United States Patent Office.

CALEB DODSWORTH AND PATRICK BURKE, OF CINCINNATI, OHIO.

DEVICE FOR HEATING AND COOLING MASHES.

SPECIFICATION forming part of Letters Patent No. 271,692, dated February 6, 1883.

Application filed December 5, 1881. (No model.)

*To all whom it may concern:*

Be it known that we, CALEB DODSWORTH and PATRICK BURKE, both citizens of the United States, and residents of Cincinnati, in the county of Hamilton and State of Ohio, have invented certain new and useful Improvements in Devices for Heating and Cooling Mashes, of which the following is a specification.

Our invention relates to a device for heating and cooling mashes for use in distilleries and breweries.

The object of our invention is to provide a rapid and economical means for heating and cooling the mash, and also for increasing the amount of saccharine matter obtained, by preventing the escape of steam in the operation of cooking.

There are several features of our invention, each of which will be fully set forth in the description of the annexed drawings, making a part of this specification.

Figure 1 is a vertical central section of our invention. Fig. 2 is a top plan view of the same.

A represents the mash tub or tank. It is preferably made of sheet metal, with the top oval or crowning, so as to be able to resist considerable pressure.

B represents an outside shell, surrounding the lower part of the tank A.

$a\,a$ represent stay-beams, which are preferably I-shaped iron beams, the flanges of which are riveted to the respective bottoms of the mash-tub A and shell B. These beams securely unite the vessels A and B together, and strengthen and support the bottom of the tub A against the pressure to which it is subjected. They extend the whole distance of the bottom of vessel A, and are perforated with holes $a^2$ to allow the water to circulate freely between the bottoms of the vessels. The shell B may be made of metal or wood. Between the vessels A and B a space, N, is left, around which a current of cold air or water is caused to pass.

C represents a man-head covering a man-hole in the top of vessel A.

$c$ represents a bracket over the man-hole, and $b$ a screw-bolt for securing the man-head in position, so as to make the interior steam-tight.

K represents an ordinary stirrer used to agitate the mash, and it serves to more uniformly and rapidly heat and cool the mash.

J represents an ordinary driving-shaft. It revolves in stuffing-box journals R in the center of the bottoms of vessels A and B.

$j\,j$ represent stirrer-arms.

F F' represent steam-inlet pipes.

G represents a water-induction pipe for supplying water to the space N between vessels A and B.

$p$ is an outlet-cock designed to draw off the water from the space N before scalding or cooking the mash.

E represents an inlet-pipe for supplying water to the interior of tub A.

O represents a test-gage, of any suitable construction, to indicate the condition of the mash in the interior of tub A.

D represents an escape-pipe for steam; I, a valve for closing up escape-pipe D.

H represents a draw-off pipe for the mash. It is provided with a valve over the mouth of the pipe to prevent the mash from escaping during the operation of cooking.

$i$ represents a rope or chain, which passes over the drum $l$ of a windlass, for raising valve I to close pipe D; $m$, a ratchet and dog for holding the valve in a closed position.

$f$ represents a pipe for the admission of a current of cold air into the vessel A to assist in cooling the mash. The several pipes E F F' $f$ have suitable cocks to open and close and control their operations.

$h$ represents an overflow-pipe to allow a current of water to be circulated through the space N around the vessel A.

$e$ represents an escape-pipe for steam, leading from the vessel A to the escape-pipe D above the valve I.

$o$ represents a cut-off valve for opening or closing the same.

P represents a safety-valve.

The mode of operation of my device is as follows: The material for the mash is run into the vessel A through the pipe L, which is then closed steam-tight. Valve I and cock-valve $o$ are closed; also air-pipe $f$ and eduction-pipe H. Steam is admitted through one or more pipes, F F', and the stirrer K is set in motion to stir the mash of the material and cause it to be uniformly heated. The gage O indicates the degree of heat to which the mash is being subjected, and the temperature is raised to a sufficient degree of heat and maintained long enough to thoroughly dissolve and cook the mash. When it is desired to cool the mash the cock o is opened to relieve the pressure upon the interior of vessel A, when valve I may be lowered and the steam allowed to escape rapidly through the large pipe D. A current of air may also be blown into the vessel A over the mash through pipe f; also, a current of cold water can be forced through pipe G, through space N, and out of overflow-pipe h. These agencies, together with the stirrer K, will rapidly and uniformly cool the mash.

By our device we can cook and cool the mash more rapidly than by the means in ordinary use. At the same time, during the operation of cooking, the steam is retained and prevented from escaping. If desired, the cooling may be all carried on by radiation through the sides of vessel A and by the circulating-water jacket alone, and by this means all escape of volatile matter is effectually prevented.

We are aware that an apparatus for heating and cooling mash has been composed of a hermetically sealed or closed cylinder jacketed on each side to receive a cooling-liquid, said cylinder connecting with a steam-supply for introducing steam to cook the mash, and having a dome connected by a pipe with an exhaust-pump for absorbing the water resulting from the condensation of the steam, said cylinder being also provided with revolving arms for dividing the mash and agitating it while being cooled. Such construction of apparatus does not constitute our invention, and is not herein claimed.

In our apparatus the annular mash-tub has its entire bottom and, practically, its entire vertical side walls jacketed by a continuous shell, and the upper portion or top wall is provided with a steam-escape pipe open to the external atmosphere, and provided interiorly with a controllable valve, whereby the tub can be closed in cooking the mash, or made to communicate directly with the external atmosphere for the escape of steam and heat in cooling the mash, which features in the described combination provide a more simple and less expensive apparatus which will efficiently perform the work to be performed.

What we claim as our invention is—

1. In an apparatus for cooking and cooling mash, the combination of the tub A, provided with the shell extending continuously around its sides and across its bottom to create the cooling-space N, and having at its top a steam-escape pipe, D, open at one end to the external atmosphere, with a controllable valve in said pipe for opening and closing the communication between the interior of the tub and the external atmosphere, a pipe for introducing cooling-liquid to the cooling-space, a pipe for introducing steam to the tub, and a revolving stirrer within the latter, substantially as described.

2. The combination, in an apparatus for heating and cooling mashes, of the mash-tub A, with the steam-escape pipe D, the downwardly-opening valve arranged within said pipe, and the steam-escape pipe e, provided with a cock and leading from the mash-tub to the pipe D, at a point in the latter above its downwardly-opening valve, substantially as described.

3. The combination, with the mash-tub, of the steam-escape pipe D, the downwardly-opening valve located within said pipe, and connected with a windlass outside of the pipe by a cord or chain, and the steam-escape pipe e, having a cock or valve, o, and leading from the mash-tub to the pipe D, at a point in the latter above said downwardly-opening valve, substantially as described.

In testimony whereof we have hereunto set our hands in the presence of two subscribing witnesses.

CALEB DODSWORTH.
PATRICK BURKE.

Witnesses:
R. J. McMAKIN,
J. T. McHUGH.